United States Patent [19]

Brown et al.

[11] Patent Number: 4,563,415

[45] Date of Patent: Jan. 7, 1986

[54] THERMOGRAPHIC SYSTEM USING NAPHTHOYLATED LEUCO PHENAZINE DYES

[75] Inventors: Harvey A. Brown, Lake Elmo; Louis M. Leichter, Woodbury; Alan G. Miller, St. Paul, all of Minn.

[73] Assignee: Minnesota Mining and Manufacturing Company, St. Paul, Minn.

[21] Appl. No.: 662,531

[22] Filed: Oct. 18, 1984

Related U.S. Application Data

[63] Continuation of Ser. No. 482,320, Apr. 5, 1983, abandoned.

[51] Int. Cl.$^4$ ................................................. G03C 1/52
[52] U.S. Cl. .................................. 430/340; 430/341; 430/338
[58] Field of Search .................... 430/338, 340, 341; 428/913; 106/21

[56] References Cited

U.S. PATENT DOCUMENTS

| | | | |
|---|---|---|---|
| 2,646,378 | 7/1953 | Davis et al. | 117/36 |
| 2,783,227 | 2/1957 | Adams et al. | 260/243 |
| 2,783,228 | 2/1957 | Adams et al. | 260/243 |
| 2,909,520 | 10/1959 | Buc | 260/243 |
| 4,379,835 | 4/1983 | Lowrey et al. | 430/338 |
| 4,386,154 | 5/1983 | Smith et al. | 430/338 |

FOREIGN PATENT DOCUMENTS

| | | |
|---|---|---|
| 2154659 | 11/1971 | Fed. Rep. of Germany . |
| 2154660 | 11/1971 | Fed. Rep. of Germany . |
| 52-23806 | 6/1977 | Japan . |
| 52-25330 | 7/1977 | Japan . |
| 1271289 | 4/1972 | United Kingdom . |

*Primary Examiner*—Won H. Louie
*Attorney, Agent, or Firm*—Donald M. Sell; James A. Smith; David L. Weinstein

[57] ABSTRACT

Thermographic composition comprising a leuco dye, a nitrate salt, and, optionally, an acid and stabilizing compound. The leuco dye contains a phenazine nucleus with naphthoyl substitutents on the 10-position and, optionally on one or both of the 3- and 7-positions through an amino group.

In their oxidized form, the leuco dyes of this invention provide access to a range of red and magenta colors which exhibit greater stability when subjected to light and temperatures characteristic of the stage of overhead projectors than that exhibited by previously available leuco dyes of this color range.

9 Claims, No Drawings

THERMOGRAPHIC SYSTEM USING NAPHTHOYLATED LEUCO PHENAZINE DYES

This is a continuation application Ser. No. 482,320 filed Apr. 5, 1983 now abandoned.

BACKGROUND OF THE INVENTION

It is well known that dyes in their reduced leuco form can provide the basis of color image forming systems. The leuco dyes may initially be relatively colorless, but can return to a colored form when oxidized, e.g., by air under acidic conditions. Examples of leuco dyes used in color image forming systems include triarylmethanes, xanthenes, styryl dyes, and azine dyes, such as, for example, phenoxazines, phenothiazines, and phenazines.

It is also known that the leuco form of a given dye can often revert spontaneously to the colored form of the dye, at the time of making the leuco form, unless the structure of the dye is altered to promote stability.

In preparing transfer sheets and carbonless papers, where the leuco form of methylene blue [3,7-bis(dimethylamino)phenothiazine] has frequently been used, stabilization has been brought about by acylation at the 10-position. For example, in U.S. Pat. No. 2,646,367 benzoylated leuco methylene blue is disclosed for use in a carbonless paper system.

U.S. Pat. No. 2,783,227 discloses that benzoylated leuco methylene blue of U.S. Pat. No. 2,646,367, when used in carbonless papers, is not very light-stable, i.e. it decomposes to the blue-green color on exposure to light. Substitution of the 1-naphthoyl group or the 2-naphthoyl group in the 10-position provides more light-stable derivatives of leucomethylene blue than does benzoylation in the 10-position.

U.S. Pat. No. 2,783,228 discloses that nitrobenzoylated leuco methylene blue is more light-stable than the benzoylated leuco methylene blue.

The foregoing patents concern acylated leuco methylene blue and explicitly mention substitution with naphthoyl groups. They do not involve acylation in the 3,7-positions of phenothiazine; they involve acylation only of the ring nitrogen. Furthermore, they make no distinction between the usefulness of 1-naphthoyl groups and 2-naphthoyl groups.

German Offenlegungsschrift No. 2154659 discloses leuco dyes for use in carbonless papers, which dyes are derived from dye nuclei of phenothiazines, phenoxazines, and phenazines by acylating the ring nitrogen with a substituent of the form V—Q—CO— where Q is O or NH and V is an aromatic or aliphatic hydrocarbon. Nucleus substituents on the 3-position are secondary or tertiary amino groups, and substituents on the 7-position are hydrogen, hydroxyl, amino, or substituted amino groups. Only the ring nitrogen is indicated as being acylated. German Offenlegungsschrift No. 2154660 discloses phenoxazines acylated on the ring nitrogen with a simple acyl radical (preferably benzoyl). Substituents on the 3- and 7-positions can be chosen from hydroxyl, amino, or substituted amino groups, and one of the substituents on the 3- and 7-positions can be hydrogen. The foregoing German patents concern acylated azine leuco dyes including phenazines. However, these patents are not concerned with acylation of the unsubstituted amine groups in the 3- and 7-positions.

British Patent Specification No. 1,271,289 deals with stabilized leuco dyes derived from water soluble dyes containing azine or oxazine rings in the chromophore. It discloses that the stabilized leuco dyes of the invention have an acyl radical attached to a tertiary nitrogen atom in the reduced ring system, and that the acyl radical can be naphthoyl. However, this patent, like the foregoing German patents, ignores the possibility of acylating the unsubstituted amine groups in the 3- and 7-positions.

Apart from their utility in transfer sheets and carbonless papers, acylated leuco forms of dyes, including phenothiazines and phenoxazines, have been found to be useful in thermographic imaging systems.

Japanese patent application No. JA49-60264 dated May 30, 1974, and published as an examined application as No. JA52-23806 on June 27, 1977 discloses a bilayer thermographic color imaging system in which one layer comprises a colorless leuco dye with an inorganic nitrate under acid conditions. The leuco dyes are of the phenothiazine and phenoxazine classes, acylated in the 10-position to stabilize them. Only benzoyl, substituted benzoyl, and alkoxy carbonyl groups are used, and the 3,7-amino substituents are limited to tertiary amines.

Japanese patent application No. JA49-67026 dated June 14, 1974, and published as an examined application as No. JA52-25330 on July 7, 1977 discloses leuco dyes having structural formulae directed to phenoxazine and phenothiazine leuco dyes with acylation of the 10-position nitrogen. Although only acyl groups from fatty acids are included, naphthoyl leuco methylene blue is listed therein.

Current thermographic compositions employing combinations of leuco dyes and nitrate salts are exemplified by assignee's copending applications U.S. application Ser. No. 199,444, filed Oct. 22, 1980, which discloses a composition containing leuco dyes, oxidizable to a colored form, in reactive association with a nitrate salt in a binder; U.S. application Ser. No. 218,559, filed Dec. 22, 1980, which discloses a composition containing a minimum of two leuco dyes in reactive association with a nitrate salt in a binder, said composition capable of providing a black image, and U.S. application Ser. No. 352,053, filed Feb. 24, 1982, which discloses a thermographic leuco dye/nitrate salt composition stabilized with a synergistic combination of antioxidants, e.g., phenidone plus catechol. Amongst the preferred classes of dyes for the compositions of U.S. application Ser. No. 218,559 and U.S. application Ser. No. 352,053 are N-acyl oxazine dyes, such as, for example, benzoylated leuco phenoxazine and N-acyl thiazine dyes, such as, for example, benzoylated leuco methylene blue.

In previous systems of thermography based on combinations of leuco dyes and nitrate salts, at least two approaches have been applied to address the problem of stability to both thermal and actinic effects. The thermal effect, with respect to thermographic processes for preparing transparencies for overhead projection, refers to the problem of attaining the highest possible thermal speed difference between temperatures ranging from 100° C. to 200° C., which range is typical of the image exposure, and those temperatures ranging from 25° C. to 60° C., which range is typical of the projector stage after prolonged operation. The actinic effect refers to problems associated with the high light intensity and elevated temperature to which the finished transparency is subjected on the projector stage.

One approach involves adding to the imaging composition stabilizing compounds, which, in most cases, are normally mild antioxidants, such as, for example, phenidone or ascorbic acid. A second approach involves altering the structure of the leuco dye. Although the first approach has sometimes been successful, it often leads to loss of sensitivity at imaging temperatures. Therefore, the second approach is preferable.

Although the previously mentioned, structurally altered leuco dyes are suitable for providing green and blue images, dyes for providing red and magenta images are so unstable that they require the addition of stabilizing compounds. Even in the presence of stabilizing compounds, their stability is often marginal.

Examination of the prior art indicates that leuco dyes with a phenazine nucleus will provide image colors in the red region. These leuco dyes have been found to exhibit good stability when acylated in the 10-position. Further analysis indicates that a given leuco phenazine with no acyl substituent in the 10-position is not only unstable to light, but is even much more unstable to light than the analagous leuco phenothiazine which contains no acyl substituent in the 10-position. Although benzoylation in the 10-position improves the light-stability of both leuco phenazines and leuco phenothiazines, such benzoylated leuco phenothiazines are useful compounds for thermographic imaging compositions, while the analagous benzoylated leuco phenazines are still far too unstable to be useful for similar types of thermographic imaging compositions.

SUMMARY OF THE INVENTION

This invention relates to thermal imaging compositions comprising stabilized leuco dyes in reactive association with nitrate salts in which the application of heat causes the reduced, relatively colorless form of the leuco dye to be oxidized to the colored dye form. 3-Amino or 3,7-diamino phenazine leuco dyes are provided with naphthoyl substituents in at least the 10-position and optionally on one or both amino groups. 1-Naphthoylation of such leuco phenazine dyes in the 10-position results in stabilities about an order of magnitude better than that of benzoylated or other acylated forms of the dyes. 1-Naphthoylation provides appreciably higher photochemical stability than does 2-naphthoylation, which, itself, provides higher stability than does benzoylation. As used in this application, the term "1-naphthoylation" means acylation with a 1-naphthoyl radical; the term "2-naphthoylation" means acylation with a 2-naphthoyl radical. Unsubstituted 3-amino and 7-amino groups can also be naphthoylated, resulting in additional advantages, such as, for example, improvement in control of wavelength of the absorption peak of the oxidized leuco dye. The dyes retain good thermal imaging speed while continuing to exhibit high stability to both thermal and actinic effects brought about by ambient and overhead projection conditions. The dyes cover a wide range of visible colors when oxidized, including reds, yellows, and magentas. Naphthoyl leuco phenazines are sufficiently light stable to provide usable stable red and magenta imaging dyes for the thermal imaging compositions contemplated in this invention.

DETAILED DESCRIPTION

In the thermographic compositions of this invention comprising a leuco dye, capable of being oxidized to give a change in color, in reactive association with a nitrate salt, wherein the cation does not react with the leuco dye, the leuco dye is a reduced form of a dye with a phenazine nucleus. As used herein, the term "change in color" includes (1) change from an uncolored or lightly colored state (optical density less than 0.2) to a colored state (an increase in optical density of at least 0.2 units), and (2) substantial change in hue. The structure of the reduced form of the dye is represented by the following general formula:

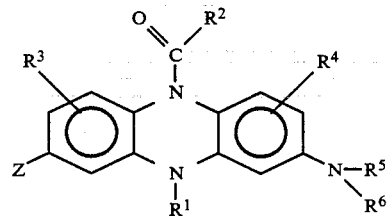

wherein
$R^1$ is selected from the group consisting of alkyl radicals, aryl radicals, alkoxy radicals, and aroyl radicals,
$R^2$ is selected from the group consisting of 1-naphthyl radical and 2-naphthyl radical,
$R^3$ and $R^4$ are independently selected from the group consisting of hydrogen, halogens, substituted or unsubstituted alkyl radicals, and aromatic rings condensed on the 1,2 and 8,9 positions,
Z is selected from the group consisting of hydrogen, —OH, —SH, substituted or unsubstituted alkyl radicals, alkoxy radicals, —$NR^5R^6$, and —$NR^7R^8$,
$R^5$ and $R^6$ are independently selected from the group consisting of hydrogen, alkyl radicals, aryl radicals, aralkyl radicals, 1-naphthoyl radical, and 2-naphthoyl radical, provided that if either $R^5$ or $R^6$ is hydrogen, the other is not hydrogen,
$R^7$ and $R^8$ are independently selected from the group consisting of hydrogen, alkyl radicals, aryl radicals, and aralykyl radicals, provided that if either $R^7$ or $R^8$ is hydrogen, the other is not hydrogen.

If $R^1$ is an alkyl radical, it is preferred that it contain 1 to 10 carbon atoms. If $R^1$ is an aryl radical, it is preferred that it only contain up to three condensed rings. If $R^3$, $R^4$, Z, $R^5$, $R^6$, $R^7$, or $R^8$ is an alkyl radical, it is preferred that it contains 1 to 4 carbon atoms. When $R^3$, $R^4$ or Z is an alkyl radical, it can contain various different substituents, so long as they are inert to the thermographic system and are not injurious to quality. Such substituents can include, but are not limited to halogen such as chloride, bromide, fluoride, and iodide, hydroxy, and alkoxy, and the like.

Leuco dyes that are suitable for the thermal imaging compositions described herein include:

max of oxidized form, nm

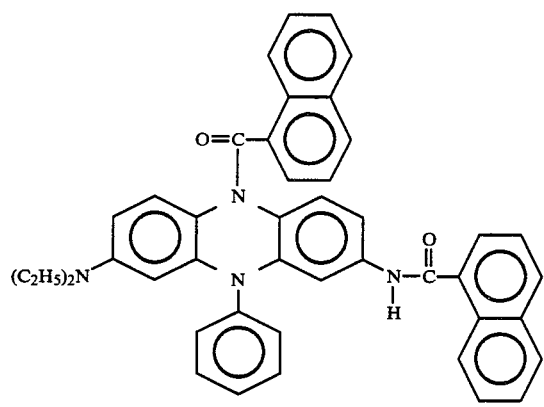
in acetone 575
542
442
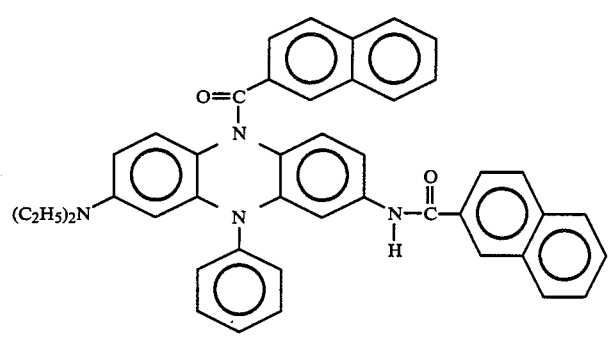
in ethanol 577
543
446
III
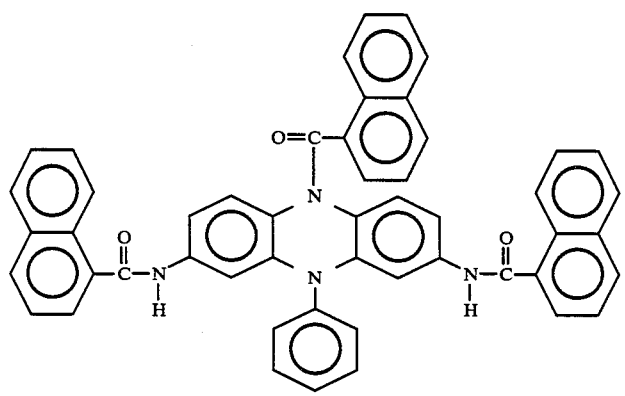
IV
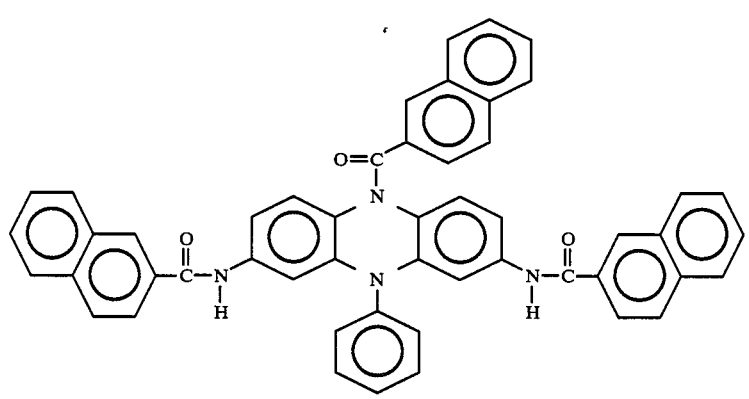

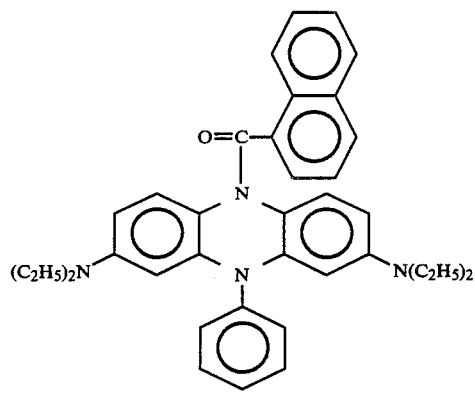
V  in ethanol 576
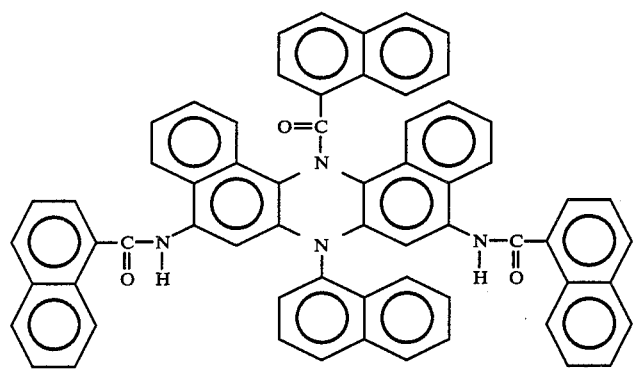
VI
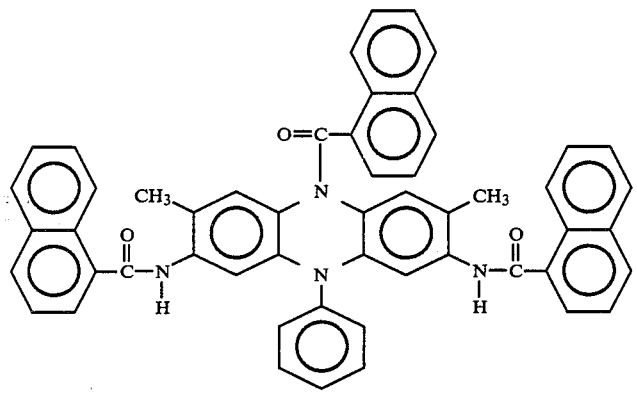
VII  in ethanol 447
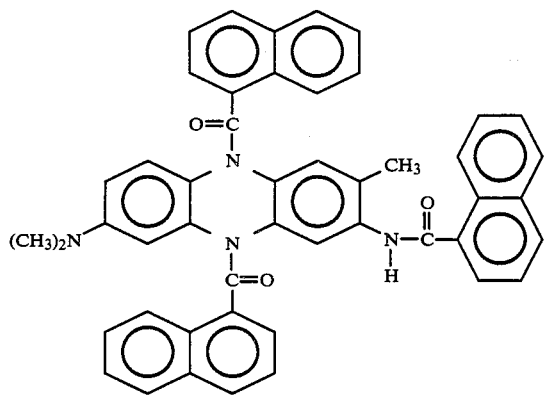
VIII
Nitrate salts suitable for this invention are themselves well known. They may be supplied as various chemical compounds, but are desirably provided as a metal salt, and most preferably provided as a hydrated metal salt.

Most means of supplying the nitrate salt into the imaging composition are satisfactory. For example, organic salts, metal salts, acid salts, mixtures of acids and salts, and other means of supplying the ion are useful. Nitrates of zinc, cadmium, potassium, calcium, zirconyl ($ZrO_2$), nickel, aluminum, chromium, iron, copper, tin, magnesium, lead, and cobalt, ammonium nitrate, and cerous ammonium nitrate can be used.

The nitrate salt component of the present invention must be present in a form within the imaging composition so that oxidizing quantities of $HNO_3$, $NO$, $NO_2$, or $N_2O_4$ will be provided within the composition when it is heated to a temperature no greater than 200° C. for 60 seconds and preferably no greater that 160° C. for 60 or most preferably 30 seconds. The salt must be chosen so that the cation thereof is non-reactive with the leuco dye. Non-reactive salts are defined in the practice of the present invention as those salts the cations of which do not spontaneously oxidize the dyes that they are associated with at room temperature.

Preferred salts are the hydrated metal salts such as nickel nitrate hexahydrate, magnesium nitrate hexahydrate, aluminum nitrate nonahydrate, ferric nitrate nonahydrate, cupric nitrate trihydrate, zinc nitrate hexahydrate, cadmium nitrate tetrahydrate, bismuth nitrate pentahydrate, thorium nitrate tetrahydrate, cobalt nitrate hexahydrate, gadolinium or lanthanum nitrate nonahydrate, and mixtures of these hydrated nitrates. Nonhydrated or organic nitrates may be admixed therewith.

It is preferred to have at least 0.10 mole of nitrate ion per mole of dye. It is more preferred to have at least 0.30 or 0.50 mole of nitrate ion per mole of dye.

The thermally stimulated oxidation of the leuco dye by the nitrate salt can be facilitated by the presence of an acid. The acids optionally useful in the thermographic compositions of this invention are acids as generally known to the skilled chemist. Organic acids, preferably those having carboxylic groups, such as phthalic acid, are preferred, but inorganic acids can also be used. The acid can be present in a ratio of from 0 to 10 times the amount of the nitrate ion.

The leuco dye, nitrate salt, and acid, when employed, are dissolved in a binder, which binder is neither strongly basic nor strongly acidic but which is sufficiently polar to hold the constituents in solution. It is preferred that the binder be selected from polymeric materials. Such resins as polyvinyl acetals, e.g. polyvinyl butyral, polyvinyl resins, polyvinylpyrrolidone, polyesters, polycarbonates, polyamides, polyacrylates, cellulose esters, copolymers and blends of these classes of resins, can be used. Saran, a vinyl chloride-vinylidene chloride copolymer, is particularly preferred. Natural polymeric materials such as gelatin and gum arabic can also be used.

The leuco dye should be present as at least 0.3% by weight of the binder, preferably as at least 1% by weight of the binder, and most preferably as from 2 to 10% or more by weight of the binder.

The preparation of the naphthoylated leuco dyes suitable for this invention follow procedures well known in the art. U.S. Pat. No. 2,909,520 discloses a process for preparing acylated leucomethylene blue wherein the starting compound, a phenazine dye, is reduced with a suitable reducing agent, e.g., sodium hydrosulfite or sodium dithionite, under aqueous alkaline conditions in the presence of a water immiscible solvent capable of dissolving the leuco dye, e.g., methylene chloride or toluene. Naphthoyl chloride is then added to the reaction mixture, and the pH is adjusted to between 3 and 6, preferably about 4. After the reaction has proceeded for several hours, the pH is raised to about 10, and the methylene chloride layer, which contains the leuco dye product, is separated. The naphthoylated leuco dye can be isolated from the solution by conventional separation techniques, including repeated decolorizing steps with active clays, such as, for example, attapulgus clay, or active carbon, recrystallizating from alcohol, or column chromatography on silica gel.

The process of U.S. Pat. No. 2,909,520 is useful not only for naphthoylating the 10-position of the leuco dye, but also for naphthoylating unsubstituted amino groups, such as, for example, those in the 3- or 7-position or both. The process of that patent will result in the substitution of one of the hydrogen atoms in the amino group. Although not markedly improving the stability of the leuco dye further, naphthoylation of an unsubstituted amino group provides a further control of the wavelength of the absorption peak of the oxidized leuco dye compared with the starting dye, i.e., the dye before reduction to the leuco form. IR spectral investigations show a disappearance of the doublet due to the pair of hydrogens on the amino groups and the NMR spectra and molecular weights of the leuco dyes are consistent with the extra naphthoyl group or groups being present.

A formulation which can be applied by conventional coating techniques can be produced by dissolving the stabilized leuco dye, the metal nitrate, and the polymeric binder, together with an organic acid, and, optionally, a stabilizing compound, in an inert organic solvent, such as, for example, acetone, methyl ethyl ketone, or tetrahydrofuran.

The formulation can be coated onto a support by methods well known in the art, such as, for example, wire-wound rod, knife, or extrusion coating. Typical wet thickness of the layer can range from about 10 to about 100 micrometers ($\mu$m), and the layer can be dried in forced air at temperatures ranging from 20° C. to 50° C. It is preferred that the coating thickness be selected to provide maximum image densities greater than 0.2, and more preferably in the range 0.5 to 1.5, as measured on a MacBeth Color Densitometer Model TD 504 using the color filter complementary to the dye color.

The support material can be selected from a wide range of materials, including paper, glass, polymeric film, and the like, depending upon the particular imaging requirement. Preferred materials include polymers having good heat stability, such as polyesters. A particularly preferred polyester is polyethylene terephthalate.

The naphthoylated leuco phenazine dyes of this invention provide several valuable properties, including, for example:

(a) capability of changing color upon application of heat in thermal imaging systems based on oxidation by metal nitrate, (b) improvement in stability to projection conditions, (c) provision of colors of the red, yellow and magenta hue, said colors previously being available only with the trade-off of very low stability to heat and radiation.

With respect to stability to projection conditions, phenazine substituted with a naphthoyl group in the 10-position is better than phenazine substituted with a benzoyl group in the 10-position, and the 1-naphthoyl species is better than the 2-naphthoyl species.

On oxidation in the thermographic system, the naphthoylated leuco phenazines lose the naphthoyl radical from the 10-position. However, no other naphthoyl radicals are lost, neither those on 3,7-amino groups nor the one in the 5-position in structure VIII. As stated previously, retention of these naphthoyl radicals is important because they influence the light absorption characteristics of the oxidized leuco dye.

The coatings prepared from the leuco dyes of this invention were tested for stability by exposing films containing imaged and unimaged areas on the stage of an overhead projector with the lamp switched on. Whereas benzoyl derivatives will generally exhibit unacceptable background density after a period of 3 to 4 hours, naphthoyl derivatives of the same leuco dyes will reach a similar unacceptable condition only after about 15 hours. Increase in background density is brought about mainly actinic effects, but thermal effects also contribute somewhat.

Preparations 1–5 demonstrate the method for preparing naphthoylated leuco dyes of structures I, III, V, VI, VII.

Preparation 1

The dye diethylphenosafranine (0.05 mole) along with 1.0 g of ethylenediaminetetraacetic acid (EDTA) were dissolved in 1 liter of deionized water, and the solution was stirred thoroughly in an inert atmosphere (argon). The pH of the solution was about 3.5. Methylene chloride (500 mL) was then added, and the pH was adjusted to 10.0 by the addition of 25% aqueous sodium hydroxide solution. Sodium dithionite (16 g) was then added, and the pH dropped rapidly to about 3. 1-Naphthoyl chloride (0.15 mole) dissolved in 100 mL of methylene chloride was then added along with sufficient sodium hydroxide to maintain the pH between 3 and 4. The resulting mixture was stirred for about 5 hours, during which time the pH rose to about 5.5. The pH was adjusted to 10.0 with additional sodium hydroxide solution, and the resulting solution was stirred vigorously for one additional hour. The methylene chloride layer was then separated, and the remaining aqueous layer extracted twice with methylene chloride. This layer was then combined with the original separated methylene chloride layer. To this combined volume was added 4 tablespoons of refined attapulgus clay (Attagel ® 50) and magnesium sulfate to effect drying, and the mixture was allowed to stand overnight in a separating funnel. The solids were then collected by filtration and washed with methylene chloride. The combined liquid was decolorized two additional times with Attagel ® 50. The solvent, i.e., methylene chloride, was then stripped off under vacuum, leaving a yellow powder. This powder was purified several times by dissolving in ethyl alcohol with vigorous stirring, filtering the remaining solid, and stripping the alcohol from the filtrate. The resulting product was the leuco dye of Structure I.

Preparation 2

The leuco dye of Structure III was prepared by the procedure used in Preparation 1, the only exception being that phenosafranine was used in place of diethylphenosafranine.

Preparation 3

The leuco dye of Structure V was prepared by the procedure used in Preparation 1, the only exception being that amethyst violet was used in place of diethylphenosafranine.

Preparation 4

The leuco dye of Structure VI was prepared by the procedure used in Preparation 1, the only exception being that Magdala Red was used in place of diethylphenosafranine.

Preparation 5

The leuco dye of Structure VII was prepared by the procedure used in Preparation 1, the only exception being that Safranine-O was used in place of diethylphenosafranine.

Preparation 6

The leuco dye of Structure II was prepared by the procedure of Preparation 1, the only exception being that 2-naphthoyl chloride was used in place of 1-naphthoyl chloride.

Preparation 7

The leuco dye of Structure IV was prepared by the procedure of Preparation 2, the only exception being that 2-naphthoyl chloride was used in place of 1-naphthoyl chloride.

Preparation 8

The leuco dye of Structure VIII was prepared by the procedure of Preparation 1, the only exception being that Neutral Red was used in place of diethylphenosafranine.

Preparations A–E

Benzoylated counterparts of the leuco dyes represented by Structures I, III, V, VII, and VIII were prepared by the procedures of Preparations 1, 2, 3, 5, and 8, respectively, the only exception being that benzoyl chloride was used in place of 1-naphthoyl chloride. The benzoylated counterparts of leuco dyes I, III, V, VII and VIII are hereinafter referred to as leuco dyes IX, X, XI, XII, and XIII, respectively.

Preparation F

A leuco dye was prepared according to the process of Preparation 1, the only exception being that biphenyl carbamoyl chloride was employed as the acylating compound. The leuco dye produced is hereinafter referred to as leuco dye XIV.

Exposure of coated films for providing test images was carried out on a platen heated to 40° C. which had vacuum holddown to ensure good contact between the film and the platen. The film was then illuminated with a 1350 W infrared linear filament lamp with reflector situated 2.5 cm from the film. A cam drive traversed the film in front of the lamp at a continuously varying speed, thus producing exposure varying continuously with distance along the film.

Two models of 3M overhead projector were used in conducting the previously mentioned image stability tests. Model 66 had a high wattage bulb and gave a relatively high stage temperature. Model 213 had a lower wattage lamp together with a heat screen which gave a relatively lower stage temperature. These two projectors represent the range of stage conditions likely to be found in conventional usage.

The following examples serve to illustrate the present invention and should not be deemed to be limitative thereof. All percentages are percent by weight unless otherwise indicated.

Example I

This Example demonstrates how images prepared from imaging compositions containing the leuco dyes of the present invention exhibit increased life on the stage of an overhead projector.

Formulations A and B were prepared by mixing the following ingredients in the amounts indicated:

| Ingredient | A Amount | B Amount |
|---|---|---|
| Benzoyl leuco dye XI | 0.07 g | |
| 1-Naphthoyl leuco dye V | | 0.077 g |
| 1% Phenidone in tetrahydrofuran | 0.80 g | 0.80 g |
| 5% Catechol in tetrahydrofuran | 0.18 g | 0.18 g |
| Tetrahydrofuran | 3.0 g | 3.0 g |
| 15% Methyl ethyl ketone | 8.0 g | 8.0 g |

Formulation A and Formulation B were coated to a wet thickness of 3 mil (75 μm) onto 4 mil (100 μm) polyester (TATS) and dried for 5 minutes at 49° C. (120° F.). Both dried formulations were top-coated with a solution prepared from the following ingredients in the amounts indicated:

| Ingredient | Amount |
|---|---|
| Ni(NO$_3$)$_2$ | 0.13 g |
| p-Toluene sulfonic acid | 0.075 g |
| Water | 3.0 g |
| 5% Polyvinyl alcohol (Elvanol ® 52-22) in water | 8.0 g |

Projector stage life results, i.e., background image density versus time on the stage of a 3M Model 66 overhead projector, are shown in Table I. Background image densities were measured with a MacBeth Densitometer Model TD504. Maximum image dye densities of about 1.0 were used in all cases.

TABLE I

Background Image Density vs Time on Stage

| Time (hrs) | Densitometer filter | Background image density A | B |
|---|---|---|---|
| 0 | Yellow | 0.03 | 0.03 |
| | Red | 0.02 | 0.02 |
| | Green | 0.03 | 0.03 |
| | Blue | 0.04 | 0.04 |
| 1 | Yellow | 0.14 | 0.03 |
| | Red | 0.03 | 0.02 |
| | Green | 0.12 | 0.03 |
| | Blue | 0.07 | 0.04 |
| 3 | Yellow | 0.39 | 0.14 |
| | Red | 0.05 | 0.04 |
| | Green | 0.39 | 0.13 |
| | Blue | 0.10 | 0.05 |

The increased stability of Formulation B compared with Formulation A is clearly observable.

EXAMPLE II

This Example demonstrates that 1-naphthoylation of a leuco dye provides an image formed from an imaging composition containing the dye with greater stability than does 2-naphthoylation of the same leuco dye. Formulations C and D were prepared by mixing the following ingredients in the amounts indicated:

| Ingredient | C Amount | D Amount |
|---|---|---|
| 1-Naphthoyl leuco dye I | 0.088 g | |
| 2-Naphthoyl leuco dye II | | 0.088 g |
| Naphthoylated leuco dye | 0.078 g | 0.078 g |
| 3,7-bis(diethylamino)-10 benzoyl-phenoxazine | 0.022 g | 0.022 g |
| 5% Catechol in tetrahydrofuran | 0.12 g | 0.012 g |
| 1% Phenidone in tetrahydrofuran | 0.60 g | 0.60 g |
| Phthalic acid | 0.06 g | 0.06 g |
| Tetrahydrofuran | 5.0 g | 5.0 g |
| Ni(NO$_3$)$_2$ | 0.13 g | 0.13 g |
| 15% Saran[1] in methyl ethyl ketone | 8.0 g | 8.0 g |
| FC-431 (fluorochemical nonionic surfactant available from 3M, St. Paul, MN) | 1 drop | 1 drop |

[1]Saran is a commercially available copolymer of vinyl chloride-vinylidene chloride.

Both formulations were coated to a wet thickness of 3 mil (75 μm) on a 4 mil polyester film (100 μm) and dried at 52° C. (125° F.) for 4.5 minutes. Stability results are shown in Table II.

TABLE II

Background Image Density vs Time on Stage[1]

| Time (hrs) | Densitometer filter | Background image density C | D |
|---|---|---|---|
| 0 | Yellow | 0.03 | 0.03 |
| | Red | 0.02 | 0.03 |
| | Green | 0.03 | 0.03 |
| | Blue | 0.04 | 0.04 |
| 6 | Yellow | 0.04 | 0.10 |
| | Red | 0.04 | 0.05 |
| | Green | 0.04 | 0.10 |
| | Blue | 0.05 | 0.09 |

[1]3M Model 66 Overhead Projector

The increased stability of Formulation C compared with Formulation D is clearly observable.

EXAMPLE III

This Example demonstrates the enhancement of photochemical stability of an image brought about by replacing a given benzoyl phenazine leuco dye of an imaging composition with its 1-naphthoyl analog. Formulations E and F were prepared by mixing the following ingredients in the amounts indicated:

| Ingredient | E Amount | F Amount |
|---|---|---|
| Leuco dye XV | 0.023 g | 0.023 g |
| Benzoyl leuco dye X | 0.050 g | 0.050 g |
| Benzoyl leuco dye IX | 0.058 g | |
| 1-Naphthoyl leuco dye I | | 0.092 g |
| 5% Catechol in tetrahydrofuran | 0.12 g | 0.12 g |
| Phthalic acid | 0.06 g | 0.06 g |
| 1% Phenidone in tetrahydrofuran | 0.65 g | 0.65 g |
| Ni(NO$_3$)$_2$ | 0.12 g | 0.12 g |
| 15% Saran in methyl ethyl ketone | 8.6 g | 8.0 g |
| Tetrahydrofuran | 5.0 g | 5.0 g |
| FC 431 | 1 drop | 1 drop |

Formulations E and F were coated to a wet thickness of 3 mils (75 μm) onto 4 mil (100 μm) polyester (TATS) and dried for 5 minutes at 49° C. (120° F.). Stability results are shown in Table III.

TABLE III

| | Background Image Density vs Time on Stage[2] | | |
|---|---|---|---|
| Time | Densitometer | Background image density | |
| (hrs) | filter | E | F |
| 0 | Yellow | 0.03 | 0.03 |
| | Red | 0.03 | 0.03 |
| | Green | 0.03 | 0.03 |
| | Blue | 0.04 | 0.04 |
| 5 | Yellow | 0.08 | 0.04 |
| | Red | 0.04 | 0.03 |
| | Green | 0.10 | 0.05 |
| | Blue | 0.11 | 0.07 |
| 8 | Yellow | 0.22 | 0.09 |
| | Red | 0.06 | 0.05 |
| | Green | 0.26 | 0.10 |
| | Blue | 0.24 | 0.12 |

[2]3M Model 66 Overhead Projector.

The increased stability of Formulation F compared with Formulation E is clearly observable.

EXAMPLE IV

This Example demonstrates that photochemical stability of an image is further enhanced when both phenazine dyes of the imaging composition are present in the 1-naphthoyl leuco forms. Formulation G was prepared by mixing the following ingredients in the amounts indicated:

| Ingredient | G Amount |
|---|---|
| Leuco dye XV | 0.023 g |
| 1-Naphthoyl leuco dye III | 0.075 g |
| 1-Naphthoyl leuco dye I | 0.092 g |
| 5% Catechol in tetrahydrofuran | 0.075 g |
| Phthalic acid | 0.06 g |
| 1% Phenidone in tetrahydrofuran | 0.70 g |
| Ni(NO$_3$)$_2$ | 0.13 g |
| 15% Saran in methyl ethyl ketone | 8.0 g |
| Tetrahydrofuran | 5.0 g |
| FC-431 | 1 drop |

Formulation G was coated to a wet thickness of 3 mils (75 μm) on a 4 mil (100 μm) polyester film and dried at 49° C. (120° F.) for 5 minutes. Stability results are shown in Table IV.

TABLE IV

| | Background Image Density vs Time on Stage[3] | |
|---|---|---|
| Time (hrs) | Densitometer filter | Background image density G |
| 0 | Yellow | 0.04 |
| | Red | 0.03 |
| | Green | 0.03 |
| | Blue | 0.04 |
| 5 | Yellow | 0.03 |
| | Red | 0.03 |
| | Green | 0.03 |
| | Blue | 0.04 |
| 13 | Yellow | 0.05 |
| | Red | 0.04 |
| | Green | 0.04 |
| | Blue | 0.06 |
| 19 | Yellow | 0.07 |
| | Red | 0.05 |
| | Green | 0.07 |
| | Blue | 0.08 |

[3]3M Model 213 Overhead Projector

Upon comparison with the results in Table III, it can be observed that a further considerable improvement in stability has occurred by employing a second naphthoylated phenazine dye in the image forming system.

EXAMPLE V

This Example illustrates the improvement in image stability resulting from the use of naphthoylated leuco dye I in the imaging composition in place of the equivalent p-phenyl benzoyl leuco dye XIV.

Formulations H and I were prepared by mixing the following ingredients in the amounts indicated:

| Ingredient | H Amount | I Amount |
|---|---|---|
| Pergascript turquoise | 0.023 g | 0.025 g |
| Naphthoyl diazine yellow | 0.07 g | 0.07 g |
| Tetrahydrofuran | 5.0 g | 5.0 g |
| 1% Phenidone in tetrahydrofuran | 0.6 g | 0.6 g |
| 5% Catechol in tetrahydrofuran | 0.12 g | 0.12 g |
| Phthalic acid | 0.06 g | 0.06 g |
| Ni(NO$_3$)$_2$ | 0.14 g | 0.14 g |
| 15% Saran in methyl ethyl ketone | 8.0 g | 8.0 g |
| FC-431 | 1 drop | 1 drop |
| Leuco dye I | 0.09 g | |
| Leuco dye XIV | | 0.09 g |

Formulations H and J were coated to a wet thickness of 3 mils (75 μm) on 4 mil (100 μm) polyester film and dried at 52° C. (125° F.) for 5 minutes.

The coated films were tested on the Model 213 Overhead Projector. The results are shown in Table V.

TABLE V

| Densitometer | Background image density | |
|---|---|---|
| filter | Film H[4] | Film H[5] |
| Yellow | 0.07 | 0.12 |
| Red | 0.06 | 0.07 |
| Green | 0.08 | 0.12 |
| Blue | 0.10 | 0.13 |

[4]Time on stage was 13½ hours.
[5]Time on stage was 6 hours.

The naphthoylated leuco dye showed substantial advantage over the analagous p-phenyl benzoylated leuco dye. This result demonstrates that the effectiveness of the naphthoyl radical is not due to its molecular weight being higher than that of the benzoyl radical. The p-phenyl benzoylated leuco dye exhibits stability more similar to that exhibited by the benzoylated leuco dye than to that exhibited by the naphthoylated leuco dye.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A thermally imageable layer consisting essentially of a polymeric binder, and at least one leuco dye in reactive association with a nitrate salt, wherein the action of heat can oxidize said at least one leuco dye to give a change in color, said at least one leuco dye having the structural formula

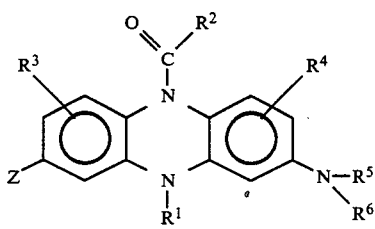

wherein
- $R^1$ is selected from the group consisting of alkyl radicals, aryl radicals, alkoxy radicals, and aroyl radicals,
- $R^2$ is selected from the group consisting of 1-naphthyl radical and 2-naphthyl radical,
- $R^3$ and $R^4$ are independently selected from the group consisting of hydrogen, halogens, substituted or unsubstituted alkyl radicals, and aromatic rings condensed on the 1, 2 and 8, 9 positions,
- Z is selected from the group consisting of hydrogen, -OH, -SH, substituted or unsubstituted alkyl radicals, alkoxy radicals, —$NR^5R^6$, and —$NR^7R^8$,
- $R^5$ and $R^6$ are independently selected from the group consisting of hydrogen, alkyl radicals, aryl radicals, aralkyl radicals, 1-naphthoyl radical, and 2-naphthoyl radical, provided that if either $R^5$ or $R^6$ is hydrogen, the other is not hydrogen,
- $R^7$ and $R^8$ are independently selected form the group consisting of hydrogen, alkyl radicals, aryl radicals, and aralkyl radicals, 1-naphthoyl radical, and 2-naphthoyl radical, provided that if either $R^7$ or $R^8$ is hydrogen, the other is not hydrogen.

2. A layer composition according to claim 1 wherein at least one of the said leuco dyes is selected from the group consisting of

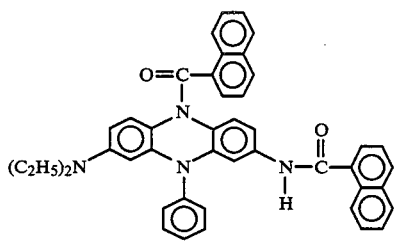

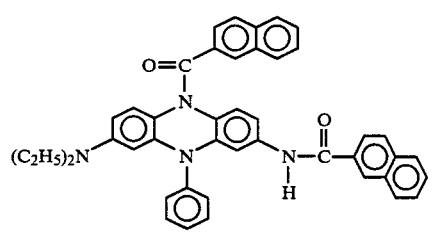

-continued

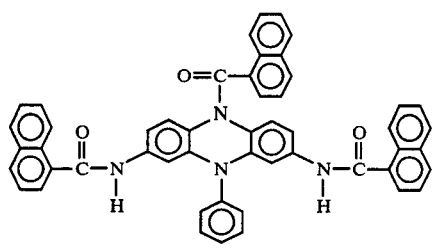

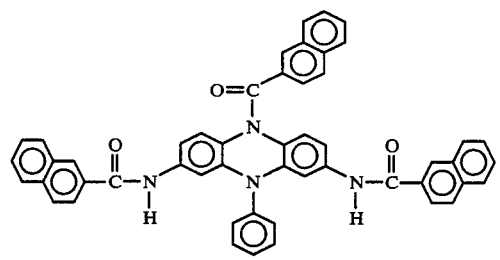

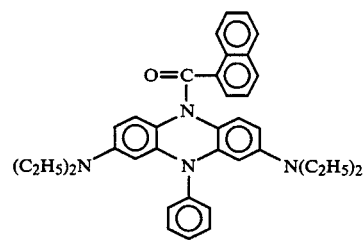

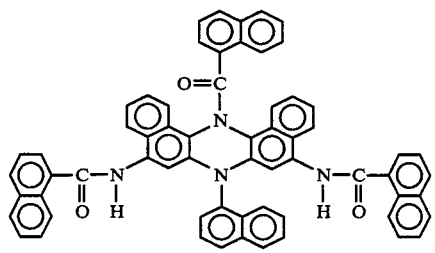

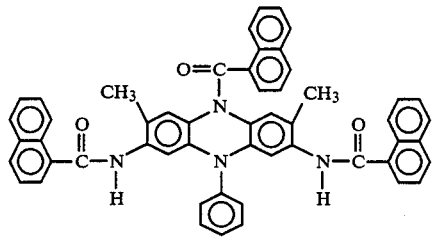

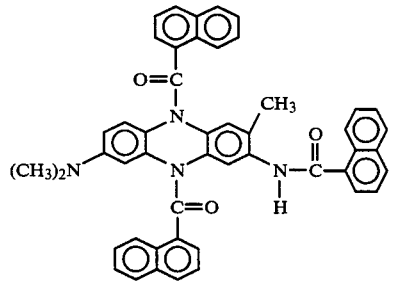

3. A layer composition according to claim 1 further including an acid.

4. A layer composition according to claim 3 wherein said acid is an organic acid having at least one carboxylic group.

5. A layer composition according to claim 1 further including a stabilizing compound selected from the group consisting of phenidone, catechol, and hydroquinone.

6. A layer according to claim 1 wherein the binder is saran.

7. A layer composition according to claim 1 wherein at least 0.10 mole of nitrate ion is present per mole of dye.

8. A layer composition according to claim 7 wherein at least 0.50 mole of nitrate ion is present per mole of dye.

9. A layer composition according to claim 3 wherein the acid is present in a ratio of from 0 to 10 times the amount of nitrate ion.

* * * * *

UNITED STATES PATENT AND TRADEMARK OFFICE
CERTIFICATE OF CORRECTION

PATENT NO. : 4,563,415

DATED : January 7, 1986

INVENTOR(S) : Harvey A. Brown, Louis M. Leichter and Alan G. Miller

It is certified that error appears in the above-identified patent and that said Letters Patent is hereby corrected as shown below:

Col. 17, line 36 "form" should read --from--.

Claims 2, 3, 4, 5, 7, 8, and 9 delete the word "composition".

Signed and Sealed this

Twenty-fifth Day of March 1986

[SEAL]

*Attest:*

*Attesting Officer*

DONALD J. QUIGG

*Commissioner of Patents and Trademarks*